United States Patent [19]

Brooks et al.

[11] 4,095,155

[45] June 13, 1978

[54] DIRECTION REVERSING DIRECT CURRENT MOTORS AND THEIR CONTROL

[75] Inventors: Ronald Robert Brooks, Hamilton Square; Jack Edward Wojslawowicz, Bayonne, both of N.J.

[73] Assignee: RCA Corporation, New York, N.Y.

[21] Appl. No.: 630,650

[22] Filed: Nov. 10, 1975

[30] Foreign Application Priority Data

Mar. 13, 1975 United Kingdom ............... 10516/75

[51] Int. Cl.² ............................................. H02P 3/00
[52] U.S. Cl. .................................... 318/541; 310/230; 318/491; 318/292
[58] Field of Search ................... 318/292, 293, 345 C, 318/345 G, 54, 541, 542, 491; 310/229, 230

[56] References Cited

U.S. PATENT DOCUMENTS

| | | | |
|---|---|---|---|
| 1,990,767 | 2/1935 | Whitsitt et al. | 310/230 |
| 3,536,974 | 2/1968 | Beigl et al. | 318/541 |

OTHER PUBLICATIONS

Electric Machinery, Fitzgerald et al., Section 4-3, "Commutator Action," pp. 192-194.

Primary Examiner—Gene Z. Rubinson
Assistant Examiner—Michael K. Mutter
Attorney, Agent, or Firm—H. Christoffersen; Allen LeRoy Limberg; John M. O'Meara

[57] ABSTRACT

A direct current motor which includes a stator for producing a fixed magnetic field and a plurality of armature windings. The motor is caused to rotate by applying current to each winding only while that winding is passing through a zone in a given orientation relative to the stator field. The direction of rotation is changed without changing the direction of the current applied to the windings, by changing the orientation of the zone relative to the stator field, to reverse the direction of the rotational force applied to the armature. Because the current does not reverse through the armature windings, the control circuit can be simple and in a preferred embodiment includes only two gate-turn-off silicon controlled rectifiers, a switch, and a resistor.

7 Claims, 4 Drawing Figures

DIRECTION REVERSING DIRECT CURRENT MOTORS AND THEIR CONTROL

The present invention relates generally to electric motors, and more particularly to reversible rotation direct current motors.

In the drawing, in which like items are indicated by like reference numbers:

In general, dc motors include both armature and field windings. The armature winding is usually wound about the rotor or rotating member of the motor, and the field winding is usually wound around the stator or stationary member of the motor. The stator may completely surround the rotor, and when a direct current is supplied to both the rotor and stator windings (i.e., to both the armature and field windings, respectively), the resultant magnetic field produced by the rotor windings reacts with the magnetic field or flux of the stator windings to cause the rotor to begin to rotate in a clockwise or counterclockwise direction, depending upon the relative directions of the interacting magnetic fields. In a dc motor, rotation of the rotor is maintained by including a commutator, to transfer direct current from brushes to successive ones of the rotor windings. To reverse the direction of rotation of the rotor, the direction of the magnetic flux from the armature or field windings is reversed. The most common way to cause such flux reversal, is to change the direction of the direct current applied to either the rotor windings (armature winding) or to the stator winding (field winding).

Figure 1:
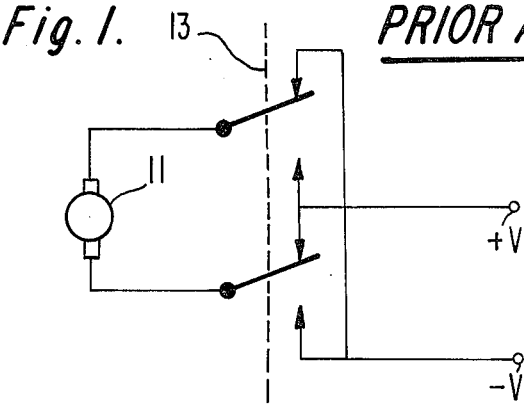
FIG. 1 is a circuit schematic diagram of a conventional permanent magnet motor and associated reversing control circuitry.

In one class of dc motor, called a permanent magnet (PM) motor, the field or stator windings generally are eliminated, the field flux being provided instead by permanent magnets. In such motors of the prior art, the way generally employed to reverse the direction of rotation of the rotor, is to reverse the direction of current through the rotor winding (i.e., armature). Such a motor 11 is shown in FIG. 1, where a double-pole-double-throw switch 13 is used to reverse the direction of current applied to the rotor winding, to permit selective direction of rotation of the motor. This type of control circuit is sometimes unreliable. If power remains on while the switch is being thrown, the switch must be capable of transferring all of the rotor current from one direction to another. If the motor is of appreciable size, this current may be sufficiently large to cause arcing across the switch contacts, resulting in their rapid deterioration.

To enhance the reliability of such a control circuit, the switch 13 can be replaced with solid state switching devices, such as transistors, silicon controlled rectifiers, etc. Although the reliability of the control circuit will be increased through the use of such electronic switching circuitry, such circuitry is relatively complex, and as a result, expensive.

The present inventors have recognized that the control circuit for a direct current motor can be greatly simplified if rotation reversal could be obtained by changing the direction of the armature field without having to reverse the direction of current flow through an armature winding. They have achieved this objective first by forming the armature of a plurality of windings and obtaining rotation by energizing only one of the windings, at a time, as that winding passes through a zone in a given orientation relative to the stator field. And then, to reverse the motor, by changing the orientation of that zone relative to the stator field.

Figure 2:
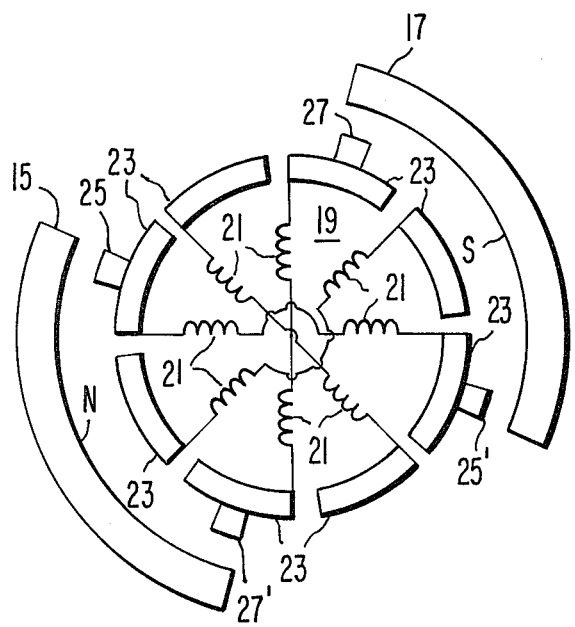
FIG. 2 is an electro-mechanical schematic of one embodiment of a reversible dc motor of the present invention.
Figure 3:
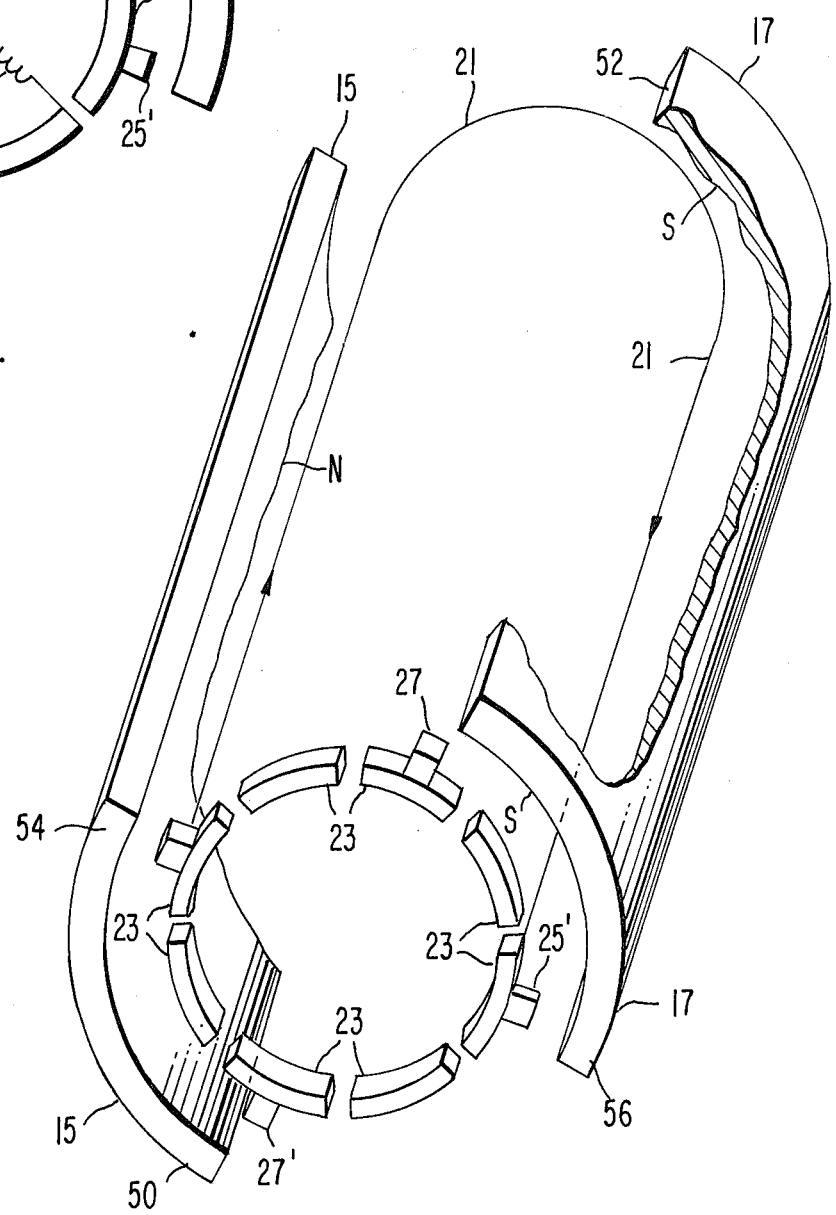
FIG. 3 is an isometric cutaway view of a portion of one embodiment of the motor of the present invention.

Referring to FIGS. 2 and 3, the present motor includes, in the preferred embodiment, a pair of permanent magnets 15, 17, for providing the stator field and an armature or rotor 19 mounted for rotation between permanent magnets 15 and 17. The armature includes a plurality of independent windings 21, each winding connected between two commutator segments 23, respectively, hereafter termed a "pair" of segments. The commutator segments 23 are relatively evenly spaced around the periphery of a circle and the segments 23 of each pair are located on opposite arcs of the circle, that is, the angle made by a line passing through the center of the circle and joining the centers of the arcs in 180°. Two pairs of brushes 25, 25' and 27, 27', respectively, are mounted for mechanically and electrically contacting successive ones of the commutator segments 23 as the armature 19 rotates. One pair of brushes 25, 25' is located so that the upper brush 25 is adjacent the upper portion of permanent magnet 15, and the lower brush 25' is adjacent the lower portion of adjacent magnet 17. The other pair of brushes 27, 27' is located so that the upper brush 27 is adjacent the upper portion of the permanent magnet 17, and the lower brush 27' is adjacent the lower portion of the permanent magnet 15. A line passing through the center of one pair of brushes is approximately 90° from a similar line passing through the other set of brushes, in this example. In the limit, one set of brushes should be spaced from the other set by an angle sufficient that there is one commutator segment 23 between any two brushes, not contacted by either brush.

The inside face of the permanent magnet 15 is a north pole, whereas the inside face of the permanent magnet 17 is a south pole, to provide a fixed stator field therebetween. The independent windings 21, as described above, are connected in what is known as an open armature winding configuration. Each of the windings 21 is wound in the same direction, for example, clockwise, about its axis. It can be shown that when wound in this way, the winding engaged with a pair of brushes (for example 25, 25') which are held at a fixed difference in a potential, say plus at 25 and minus at 25', will always produce a field in the same relative direction.

To operate the motor, a dc voltage supply (not shown) is connected to brushes 25 and 25', for example, with its positive lead connected to the brush 25 and its negative lead to brush 25', while brushes 27, 27' remain floating electrically. Armature 19 will begin to rotate in response to the interaction between the stator magnetic field and the winding 21 magnetic field. The direction of rotation will depend upon the sense of the voltage difference between brushes 25 and 25' and the direction in which the windings 21 are wound. In the example of FIG. 3, which shows a single turn of one of the armature windings 21, the armature field is north at edge portion 50 of pole piece 15 and south at edge portions 52 of pole piece 17 so the motor will rotate counterclockwise. As the armature rotates, successive ones of the windings 21 are energized via the interaction between the commutator segments 23 and the brushes 25, 25', sustaining the continuous rotation of the armature 19.

To reverse the direction of rotation of this motor (see FIGS. 2 and 3), the dc voltage is removed from brushes 25, 25', leaving them electrically floating, and transferred to brushes 27 and 27', with the positive lead connected to brush 27 and the negative lead to 27'. The reason that the armature rotor 19 reverses its direction of rotation, is that in so transferring the voltage, and so positioning the brushes 25, 25', 27, 27', the direction of the magnetic field created by the flow of current through the windings 21 is rotated through an angle (roughly 90° in this example) with respect to the stator field. Referring to FIG. 3, it can be seen that when winding 21 moves to a position such that it is receiving current from brushes 27 (positive) and 27' (negative), the magnetic field created by this winding will be north at edge 54 of north pole piece 15 and south at edge 56 of south pole piece 17. The result is clockwise rotation of the armature. Although the armature field direction has been changed, it should be noted that the direction of current flow through the windings 21 has not been changed. This is important because it permits the use of a control circuit which is very simple, only two silicon controlled rectifiers, a switch, and a resistor in the sample discussed shortly.

Although in the description of the preferred embodiment, the stator field is provided by permanent magnet 15 and 17, this field could also be provided by electromagnets. However, in some applications the use of electromagnets for supplying the stator field is not as desirable as the use of the permanent magnets 15 and 17, as such electromagnets may somewhat complicate and increase the cost of the motor.

Figure 4:
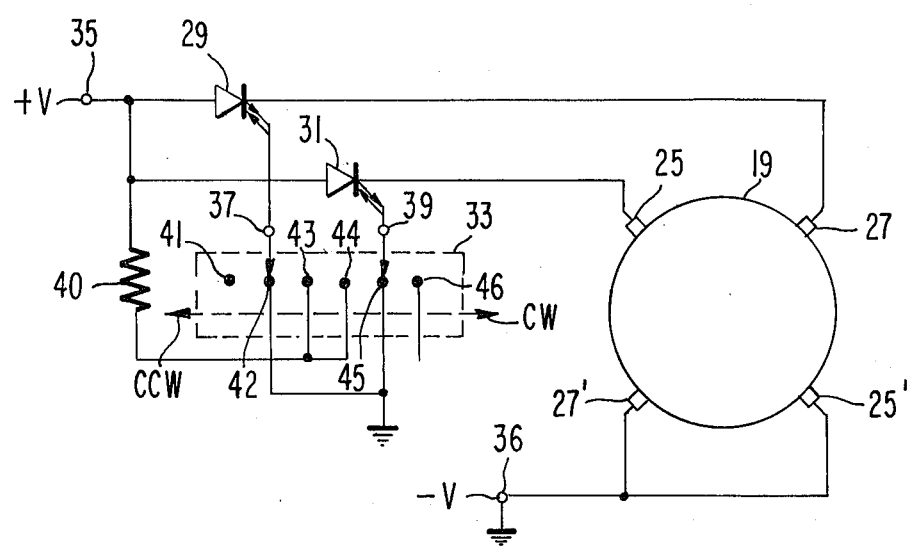
FIG. 4 is a schematic circuit diagram of one embodiment of the control circuitry for controlling one embodiment of the inventive dc motor.

FIG. 4 illustrates an example of an electronic motor control circuit for controlling the motor of FIG. 2. It includes a pair of gate turn-off silicon conrolled rectifiers (GTO's) 29, 31, and a double-pole-double-throw-center-position-off switch 33. The GTO's 29, 31 each have an anode electrode connected in common to the positive terminal 35 of the voltage supply (not shown), a cathode electrode connected to brushes 25 and 27, respectively, and a gate or control electrode connected to poles 37 and 39, respectively, of switch 33. The switch 33 also has a pair of contacts 41 and 46 unconnected, a pair of contacts 42 and 45 connected in common to a point of reference potential, ground in this examle, and another pair of contacts 43 and 44 coupled in common to the positive voltage terminal 35 via current limiting resistor 40. Motor brushes 27' and 25' are connected in common to the negative voltage terminal 36, which is also connected to ground.

When switch 33 is placed in the clockwise (CW) position, the main current conduction path including the anode and cathode electrodes of the GTO 31 is disabled, its control electrode is floating via pole 39 and contact 46 of switch 33. Accordingly, the high impedance path presented by the anode and cathode electrodes of GTO 31 prevents current from flowing from the positive terminal 35 to the brush 25, effectively disconnecting this brush from the postive voltage terminal 35. A positive voltage is applied to the gate electrode of the GTO 29, via pole 37 and contact 43 of switch 33, turning GTO 29 on. The voltage +V is thereby applied to brush 27 via the main current conduction path (anode-cathode electrode current path). To stop the rotation of the motor, switch 33 is placed in a neutral position, where the gate electrodes of GTO's 29 and 31 are grounded via contacts 42 and 45, respectively. If switch 33 is thereafter thrown to the counterclockwise position, GTO 29 has its gate floating and remains off, while GTO 31 is turned on via pole 39 and contact 44. The turn-on of GTO 31 causes +V to be placed on brush 25, causing the motor to rotate in a counterclockwise direction.

If the motor is built to withstand the stress of electrodynamic braking, there is no need to remove the voltage from across terminals 35 and 37 or to place the switch 33 in a neutral position, in each case to bring the rotation of the armature to a stop, before changing the switch from its CW to its CCW (or vice versa) position. In this case, all that would be required is to move switch 33 to the desired direction of rotation, which would cause the motor to electrodynamically stop the rotation of the rotor, and thereafter to cause the rotor to rotate in the desired direction.

The control circuit of FIG. 4 is relatively inexpensive and therefore especially suited for use in high volume applications, such as in passenger vehicles. Notwithstanding its relatively low cost, the circuit is very reliable, in that the switch 33 is only used to switch the very small gate or control current required for GTO's 29 or 31 to turn either on. The high initial starting current or locked-rotor current of the motor flows through either of the current conduction paths of the anode-cathode electrode of either GTO 29 or GTO 31. Accordingly, contact deterioration of switch 33 by high currents and inductive arcing has been substantially eliminated, in addition to simplification of the electronic circuitry required through use of the subject motor.

The present invention is not limited to the use of the dc motor illustrated. For example, the number of poles, number of independent windings, and the number of related commutator segments can be changed by increasing these numbers, for example, increases the motor speed. The torque of such a motor is related to the number of turns per winding, and the number of windings active at any given time, in addition to the strength of the stator field relative to the strength of the rotor field, and these various parameters can vary over a wide range, depending upon the use for which the motor is designed, in the motor of FIG. 2. The torque also can be increased by using more than two pairs of brushes, that is by using two groups of brushes, each group having at least two brushes, where the two groups are separated by at least one commutator segment, and these also are possibilities within the scope of the present invention.

We claim:

1. A rotation reversing direct current motor apparatus, comprising:
    a stator for providing a fixed magnetic field;
    an armature mounted for rotation in said magnetic field, said armature having a plurality of both electrically independent windings and commutator segments radially distributed about the rotational axis thereof, said commutator segments being electrically isolated from one another, and each of said windings being successively connected between two of said opposingly disposed commutator segments;

first and second pairs of opposingly disposed brushes fixedly mounted relative to said stator for electrically and mechanically contacting said commutator segments, said first pair of brushes being disposed for passing current of a given polarity successively through said windings in a given direction to produce an armature field that interacts with said fixed magnetic field to cause rotation in one direction and said second pair of brushes being disposed for passing current of the same said given polarity successively through said windings in the same said given direction to produce an armature field that interacts with said fixed magnetic field to cause rotation in an opposite direction, said first pair of brushes being separated from the second by at least one commutator segment; and means for selectively applying a voltage across either said first pair of brushes to obtain clockwise motor rotation or said second pair of brushes to obtain counter-clockwise motor rotation.

2. The system of claim 1, wherein said means for selectively applying a voltage comprises:

two terminals for a direct current operating voltage;

first and second switching devices, each having a main current conduction path and a control electrode, each device connected at one end of its conduction path to one of said terminals, and each connected at the other end of its conduction path to one of said brushes of each pair, respectively, the remaining brush of each pair being connected to the other of said terminals; and means coupled to said control electrodes for selectively turning one of said devices on and the other off.

3. The system of claim 2, wherein said first and second switching devices comprise gate-turn-off silicon controlled rectifiers.

4. The system of claim 1, wherein said magnetic comprises permanent magnets for providing said fixed stator field.

5. The combination of:

a direct current motor having a stator for providing a fixed magnetic field, an armature mounted for rotation in said field, said first and second pairs of opposingly disposed brushes fixedly mounted relative to said stator; said armature having a plurality of both electrically independent windings and commutator segments radially distributed about the rotational axis thereof, said commutator segments being electrically isolated from each other and each of said windings being successively connected between two of said opposingly disposed commutator segments; said first pair of brushes being disposed for passing current of a given polarity successively through said windings in a given direction to produce an armature field that interacts with said fixed magnetic field to cause rotation in one direction and said second pair of brushes being disposed for passing current of the same said given polarity successively through said windings in the same said given direction to produce an armature field that interacts with said fixed magnetic field to cause rotation in an opposite direction, said first pair of brushes being separated by at least one commutator segment from said second pair of brushes, one brush of each said pair being connected to a point of reference potential; and a rotation control circuit for said motor comprising first and second gate turn-off silicon controlled rectifiers, each said gate turn-off rectifier having a main conduction path and a control electrode, each said main conduction path being connected at one end to a terminal for a direct current operating voltage, one main conduction path being connected at its other end to the other brush of said first pair, and the other main conduction path being connected at its other end to the other brush of said second pair, and means coupled to said control electrodes for selectively turning one of said rectifiers on and the other off to obtain motor rotation in a desired direction.

6. A reversible rotation direct current motor, said motor comprising:

a stator for providing a fixed magnetic field;

an armature mounted for rotation in said magnetic field, said armature having a plurality of both electrically independent windings and commutator segments radially distributed about the rotational axis thereof, said commutator segments being electrically isolated from one another and each of said windings being successively connected between two of said opposingly disposed commutator segments; and first and second pairs of opposingly disposed brushes fixedly mounted relative to said stator for electrically and mechanically contacting said commutator segments, said first pair of brushes being disposed for passing current of a given polarity successively through said windings in a given direction to produce an armature field that interacts with said fixed magnetic field to cause rotation in one direction and said second pair of brushes being disposed for passing current of the same said given polarity successively through said windings in the same given direction to produce an armature field that interacts with said fixed magnetic field to cause rotation in an opposite direction, said first pair of brushes being separated from the second by at least one commutator segment, said first pair of brushes being connectable across a direct current operating voltage to cause motor rotation in one direction and said second pair of brushes being connectable across said operating voltage to cause motor rotation in the other direction.

7. A rotation reversing direct current motor apparatus, comprising:

a stator for producing a fixed magnetic field;

an armature mounted for rotation in said magnetic field, said armature having a plurality of both electrically independent windings and commutator segments radially distributed about the rotational axis thereof, said commutator segments being electrically isolated from one another and each of said windings being successively connected between two of said opposingly disposed commutator segments; and first and second pairs of opposingly disposed brushes fixedly mounted relative to said stator for electrically and mechanically contacting said commutator segments, said first pair of brushes being disposed for passing current of a given polarity successively through said windings in a given direction to produce an armature field that interacts with said fixed magnetic field to cause rotation in one direction, said second pair of brushes being disposed for passing current of the same said given polarity successively through said windings in the same said given direction to produce an armature field that interacts with said fixed magnetic field to cause rotation in an opposite direction, said first pair of brushes being separated from the second by at least one commutator segment; and a control circuit for selectively switching a direct current operating voltage across either of said first or second pairs of brushes, said motor rotation being in one direction when said voltage is switched across said first pair of brushes and being in the opposite direction when said voltage is switched across said second pair of brushes.

* * * * *

UNITED STATES PATENT AND TRADEMARK OFFICE
CERTIFICATE OF CORRECTION

PATENT NO. : 4,095,155

DATED : June 13, 1978

INVENTOR(S) : Ronald Robert Brooks et al

It is certified that error appears in the above-identified patent and that said Letters Patent is hereby corrected as shown below:

Column 2, line 27, "in" should be --is--.

Column 3, lines 30 and 31 "sample" should be --example--;

line 53, "examle" should be --example--;

lines 54 and 55, "currrent" should be --current--.

IN THE CLAIMS

Claim 6, line 24, --said-- should be inserted after "same".

Signed and Sealed this

Thirteenth Day of March 1979

[SEAL]

Attest:

RUTH C. MASON
Attesting Officer

DONALD W. BANNER
Commissioner of Patents and Trademarks